(12) United States Patent
Papamartzivanos et al.

(10) Patent No.: US 10,084,822 B2
(45) Date of Patent: Sep. 25, 2018

(54) INTRUSION DETECTION AND PREVENTION SYSTEM AND METHOD FOR GENERATING DETECTION RULES AND TAKING COUNTERMEASURES

(71) Applicant: NEC Europe Ltd., Heidelberg (DE)

(72) Inventors: Dimitrios Papamartzivanos, Eppelheim (DE); Felix Gomez Marmol, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 189 days.

(21) Appl. No.: 15/158,605

(22) Filed: May 19, 2016

(65) Prior Publication Data

US 2017/0339187 A1    Nov. 23, 2017

(51) Int. Cl.
*H04L 29/06* (2006.01)
*G06N 7/00* (2006.01)

(52) U.S. Cl.
CPC ........... *H04L 63/20* (2013.01); *G06N 7/005* (2013.01); *H04L 63/0263* (2013.01); *H04L 63/1425* (2013.01); *H04L 63/1441* (2013.01)

(58) Field of Classification Search
CPC ..................................................... H04L 29/06
See application file for complete search history.

(56) References Cited

U.S. PATENT DOCUMENTS

2007/0088717 A1* 4/2007 Chen .............. G06F 17/30705
2012/0278263 A1* 11/2012 Borthwick ...... G06F 17/30303
706/12

OTHER PUBLICATIONS

Keki B. Irani, et al, "Multi-interval discretization of continuous-valued attributes for classification learning", JPL TRS 1992+, Sep. 1, 1993, pp. 1022-1027.
Selma Elhag, et al., "On the combination of genetic fuzzy systems and pairwise learning for improving detection rates on Intrusion Detection Systems", Expert Systems with Applications 42, Dec. 2015, pp. 193-202.

* cited by examiner

*Primary Examiner* — Brandon S Hoffman
(74) *Attorney, Agent, or Firm* — Leydig, Voit & Mayer, Ltd.

(57) ABSTRACT

A detection rules generation engine includes an initial population creation subsystem configured to receive filtered network traffic instances from a network tap and to build an initial population of decision trees having nodes which are sorted based on an information gain of network features of the traffic instances. A parents selection subsystem is configured to select two individuals from the population based on a selection probability. A depth selection subsystem is configured to select a depth among the nodes of the decision trees. A parents crossover subsystem is configured to apply a crossover operation on the selected individuals. A parents mutation subsystem is configured to apply a mutation operation on the selected individuals. A population replacement subsystem is configured to generate a next population.

13 Claims, 8 Drawing Sheets

INTRUSION DETECTION AND PREVENTION SYSTEM AND METHOD FOR GENERATING DETECTION RULES AND TAKING COUNTERMEASURES

FIELD

The present invention relates to an intrusion detection and protection system (IDPS), including a rules detection rules generation engine useable therein or therewith, as well as a method useable therein to generate detection rules and take countermeasures against attacks.

BACKGROUND

The aim of an IDPS is to protect systems, computers, networks and network-connected devices from a variety of attacks threatening their confidentiality, integrity and availability. The Internet is an active ecosystem which evolves rapidly and constantly changes while new types of attacks emerge as the attackers become more sophisticated. In this context, an IDPS needs to be constantly updated in order to detect novel attacks.

IDPSs can be classified into two major categories namely anomaly detection and prevention systems and misuse and prevention detection systems. Anomaly detection and prevention systems are designed to identify deviations from a normal profile behavior in order to detect malicious actions. Even though this kind of system performs better in detecting previously unseen attacks, they suffer from a high False Positive rate rendering them unpractical solutions for protecting a sensitive infrastructure.

With a misuse IDPS, the detection process is based on known signatures or, in other words, detection rules aiming to distinguish legitimate traffic instances from the malicious ones.

Currently, state of the art approaches are able to generate rules for detecting popular classes of attacks, but significantly neglect the minority attack classes. Even if these types of attacks are less common, their impact on the targeted system is considered to be destructive. Attacks such as remote vulnerability exploitations or privilege escalation could lead to a system becoming compromised by an attacker or confidential information leaks, causing financial losses and harming the trustworthiness of the organization.

Analyzing network traffic flows in the context of IDPS is a challenging task mainly because of the nature of the network traffic data. Under realistic terms, a network is flooded with normal traffic flows and only a smaller fraction of the traffic may indicate malicious behavior. This leads to a highly unbalanced data set that is difficult to analyze. In addition, a network analysis process focuses on several features that have to be taken into consideration for distinguishing legitimate from malicious traffic. The aforementioned data properties combined with the numerous attack types introduce many challenges and affect the detection accuracy to a great extent. In short, in many settings, an IDPS is tasked to function with datasets that are characterized by:

Being multi-classed (several types of attacks),
Being multi-featured (several network traffic attributes), and
Being highly un-balanced (many instances of normal network traffic, but very few instances of rare attacks).

Elhag, Salma, et al., "On the combination of genetic fuzzy systems and pairwise learning for improving detection rates on Intrusion Detection Systems," Expert Systems with Applications 42.1 (2015): 193-202 describe complex classification techniques in the context of Fuzzy Rule Based Classification Systems. However, even using such complex classification techniques, which consume a great deal of computing power in comparison with embodiments of the present invention, only an 89.32% of average accuracy for the aforementioned attacks can be achieved. Additionally, this system cannot be exploited without de-fuzzing steps and considers only a subset of the search area.

Generally, state of the art approaches apply either sampling techniques on the datasets to come up with a subset with specific characteristics or remove redundant instances. In contrast, in an embodiment discussed below, the present invention advantageously uses all available data to infer attacks.

SUMMARY

In an embodiment, the present invention provides a detection rules generation engine including a plurality of subsystems. An initial population creation subsystem is configured to receive filtered network traffic instances from a network tap and to build an initial population of decision trees having nodes which are sorted based on an information gain of network features of the traffic instances. A parents selection subsystem is configured to select two individuals from the population based on a selection probability. A depth selection subsystem is configured to select a depth among the nodes of the decision trees. A parents crossover subsystem is configured to apply a crossover operation on the selected individuals. A parents mutation subsystem is configured to apply a mutation operation on the selected individuals. A population replacement subsystem is configured to generate a next population.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Keeping a rule database of an IDPS up-to-date is a challenging task that involves supervision of a system administrator. Considering the huge traffic volume passing through central network nodes as an IDPS, the inventors have come to the conclusion that it is particularly advantageous if, in an embodiment, the rule generation process is supported by automated tools able not only to distinguish between legitimate and malicious traffic, but also to infer the specific class of an attack occurring to a target system.

In this context, detection rules are generated under two main premises according to embodiments of the present invention. On the one hand, the rules can be designed to enable the IDPS to take accurate decisions concerning both popular and rare attacks. On the other hand, the generated rules can be designed to be linguistically interpretable for human comprehension in order to add value to system's administration task.

Figure 1:
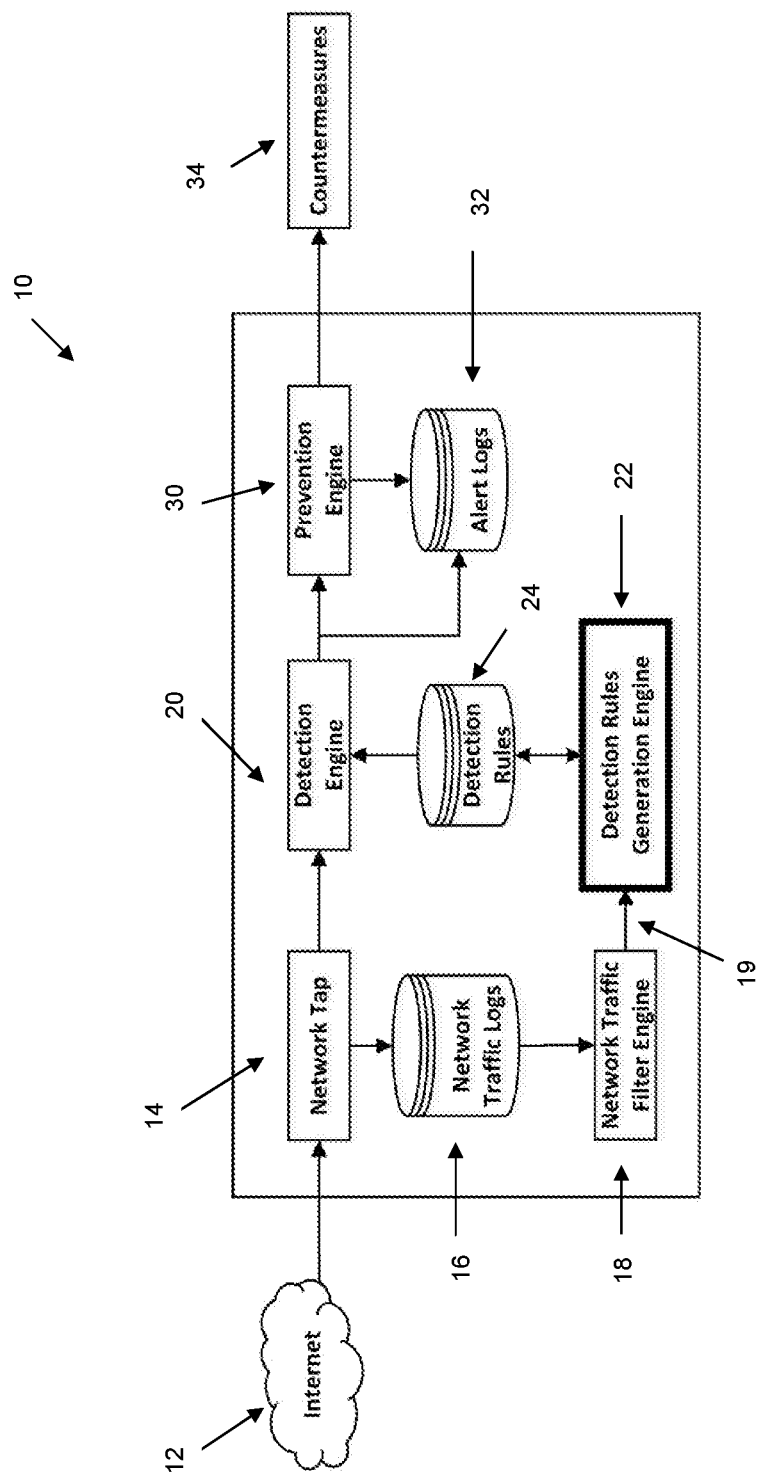
FIG. 1 is a schematic overview of an IDPS.

FIG. 1 schematically shows an IDPS 10. The IDPS 10 is a central node through which network traffic flows. Raw network activity from the Internet 12 is taken from a network tap 14. The IDPS 10 creates and stores in memory network traffic logs 16 which are evaluated by a network filter engine 18. Using the filtered traffic 19 as output from the network filter engine 18, a detection rules generation engine 22 generates and/or modifies detection rules and stores the rules in a detection rules database 24. The detection rules are used by a detection engine 20 on the network traffic. A prevention engine 30 can be used in conjunction with the detection engine 20 in order to provide countermeasures against abusive actions detected by the detection engine 20 based on the detection rules stored in the database 24. Alert logs are created and stored in an alert logs database 32 by the detection engine 20 and/or the prevention engine 30. Countermeasures 34 can be taken including, for example, notification e-mails to system administrators, enabling and providing monitoring actions for tracing the source and the purpose of the abusive action, reconfiguration of firewall rules to block the source of the attack, isolation of/disconnecting the under-attack network asset from the network, etc.

Figure 2:
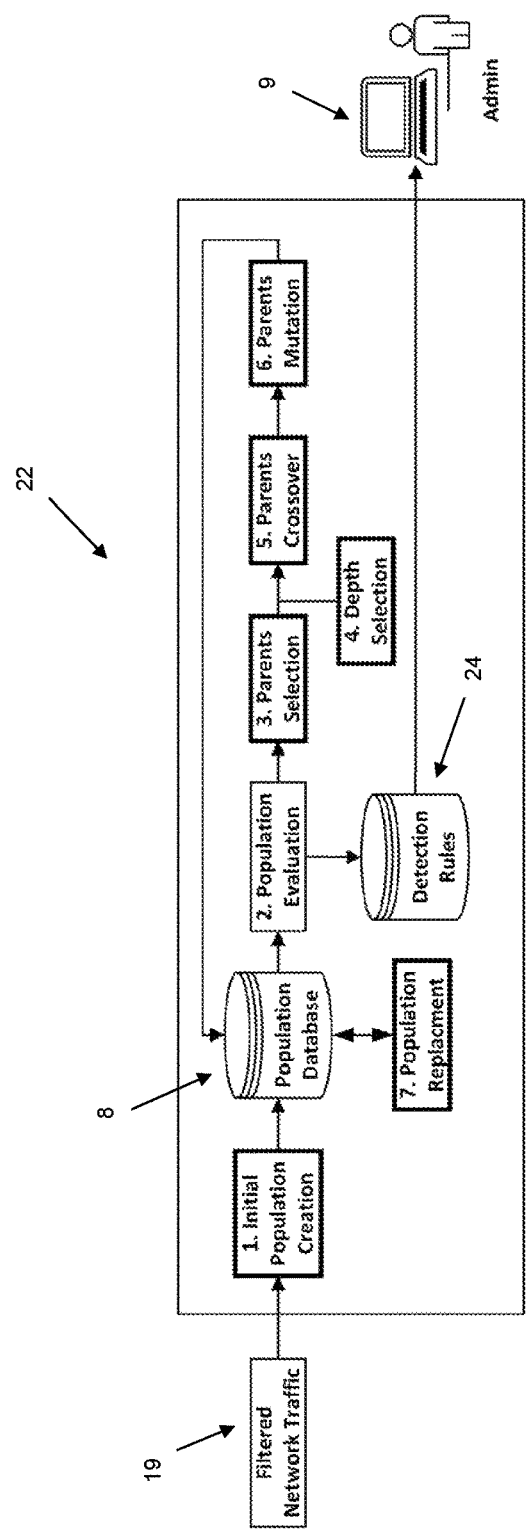
FIG. 2 is a schematic system diagram of an IDPS in accordance with an embodiment of the present invention.

FIG. 2 is a schematic system diagram showing the interaction of various subsystems 1, 2, 3, 4, 5, 6 and 7 of the detection rules generation engine 22 in accordance with an embodiment of the present invention. These subsystems, 1, 2, 3, 4, 5, 6, and 7, described in greater detail below, each comprise one or more processors and/or servers specially configured by the algorithms described below and interact to enhance the classification ability of the end model. In the context of misuse intrusion detection and prevention systems, for example, the detection rules generation engine 22 can be used as a complementary system for supporting the procedure of generating and updating detection rules in the detection rules database 24. As discussed herein, one advantage of the detection rules generation engine 22 is that it alleviates the system's administration burden, including human and computational resources of an admin 9, while at the same time providing to the detection engine 20 of the IDPS 10 the rules to detect rare attack classes.

In an embodiment, the present invention uses decision trees in order to create classification rules capable of accurately categorizing the network traffic flowing through the IDPS 10. To build the optimal decision trees for a given network traffic dataset, an embodiment of the present invention utilizes evolutionary techniques. A combination of decision trees and genetic algorithms are applied in a novel and inventive manner to achieve an optimal solution for generating and constantly updating and evolving detection rules.

Genetic algorithms (GAs) are a prevalent type of evolutionary algorithm, which imitate Darwin's evolutionary principles. GAs are based on the concept of population evolution using procedures inspired by the evolution theory. GAs generally comprise the following fundamental steps: (i) Initial population creation, (ii) Select individuals (iii) Cross-over individuals (iv) Mutate individuals and (v) Replace population. These sequential steps are repeated until a termination condition is met. The aim of the evolutionary steps is to explore the search space of the problem and come up with the best solution among the feasible solutions. The "best" solution is the one with the highest fitness value. The fitness function can be any metric, in the context of a problem, that can be used to evaluate the solutions. In an embodiment of the present invention, GAs are used to evolve populations of decision trees. In other words, a decision tree is considered an individual in the GA and decision nodes are considered as genes of individuals. The crossover and mutation operations are applied between two selected individuals upon a specifically selected gene with the aim to generate new individuals hopefully "better" than their ancestors. In different embodiments, different legacy classification metrics could be used as a fitness function to measure the classification ability of a multi-classed decision tree. The evolutionary procedure evolves individuals toward maximizing their fitness. In this way, embodiments of the present invention utilize the combination of decision trees and genetic algorithms to lead to a set of accurate detection rules.

In an embodiment, the present invention provides a system and methodology for generating detection rules in a misuse IDPS. The aim is to alleviate the system's administration burden and at the same time to provide to the detection unit of the IDPS the rules to detect rare attack classes.

In an embodiment, the proposed system takes advantage of a decision trees classification model, to meet the premise of the interpretability of the generated rules, in combination with evolutionary techniques in an effort to increase the accuracy of the detection rules generated upon the classification model. More specifically, a genetic evolutionary algorithm is applied on a population of decision trees aiming to result in an accurate classification model which can be translated into detection rules in a straightforward manner.

In an embodiment, the proposed methodology involves specific genetic algorithm steps discussed in detail below to enhance the classification ability of the end model. In every step, heuristic methods are introduced in order to overcome challenges which are mainly posed by the nature of the problem.

First, an initial population is created wherein each individual is represented by a simple decision tree. Then, by applying specifically designed operations of i) individuals' selection, ii) crossover, iii) mutation and iv) replacement, the initial population evolves over time until it contains an individual (decision tree) capable of accurately classifying network traffic which is 1) multi-classed, 2) multi-featured and 3) highly un-balanced.

Figure 3:
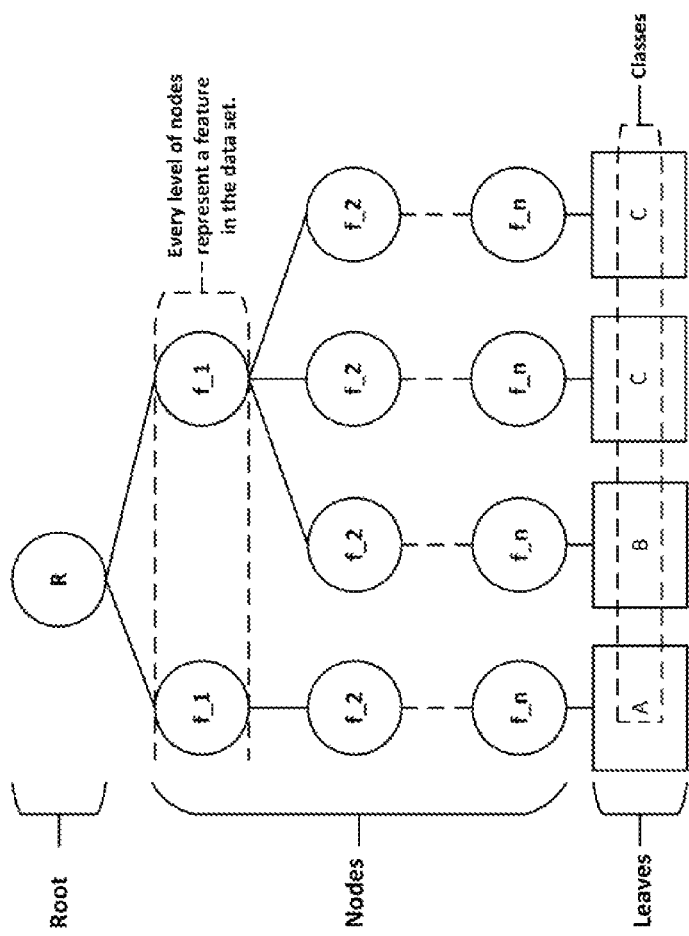
FIG. 3 illustrates a decision tree implemented by subsystems of the IDPS of FIG. 2.

Referring to FIG. 3, a decision tree classification model is shown which is used to meet the premise of the interpretability of the generated rules, in combination with evolutionary techniques in an effort to increase the accuracy of the detection rules generated upon the classification model. More specifically, a genetic evolutionary approach is applied on a population of decision trees aiming to result to an accurate classification model which can be translated into detections rules in a straightforward way.

Decision trees are a classification model supporting decision making in the context of machine learning. Decision trees are constructed as graphs, where internal nodes represent conditions for testing attribute values of instances in a dataset with the aim to infer to the class in which the instance belongs. Decisions upon inputs are taken on the leaves of the tree. Each leaf represents a class that classifies an instance if its input values satisfy the conditions of the nodes that sequentially construct a path from the root to the corresponding leaf. Several classification algorithms have been proposed for building decision trees, including C4.5 classifier. Algorithms are used in order to create a decision tree based on training instances and then their classification ability is measured during a testing period on previously unseen data.

Figure 4:
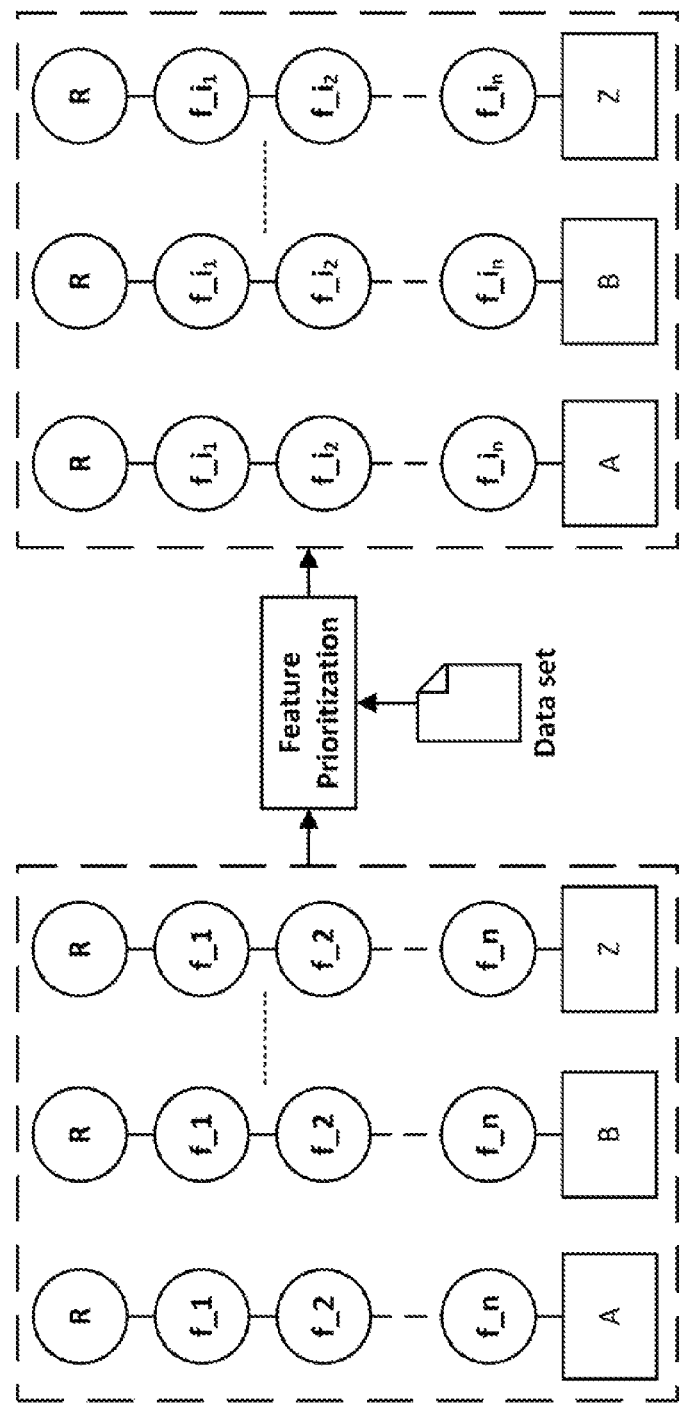
FIG. 4 illustrates an initial prioritization and feature prioritization of an evolutionary process for maximizing detection accuracy.

Initial population creation subsystem 1 receives as input the filtered network traffic 19 as already filtered traffic instances. In this context, filtered traffic instances refer to machine learning oriented data sets formed by applying transformations on raw network traffic coming from a network tap 14, for example, in a manner known in the art. Based on the filtered traffic instances given as input, the initial population creation subsystem 1 undertakes the creation of the initial population. This initial population consists of decision trees with minimum classification capabilities. For example, the decision trees can only be able to classify instances of one class and their node's conditions are always true (see FIG. 4 showing that the decision trees of the initial population are not branched at all). The decision trees will gradually evolve through the crossover and mutation processes described in further detail below. The size of the population is a property of the system that is based on the number of traffic classes and is adjustable by the admin 9 by setting the desired number of individuals per attack class. For example, if the input traffic consists of five traffic classes and the admin 9 sets the parameter for the individuals equal to ten, then the size of the initial population will be equal to fifty.

In an embodiment, the sequence of the nodes of the decision trees is considered an important parameter for achieving a higher classification accuracy of the system. For example, the prioritization of the decision nodes can be driven by the information gain of the attribute they represent with respect to the class, given the input dataset. Information gain is a metric to evaluate the worth of an attribute. In an embodiment, this can be the significance of the corresponding node of the decision tree based on the following formula:

InfoGain(Class, Attribute)=Entropy(Class)−Entropy(Class|Attribute)

Therefore, the individual decision trees, or individuals, are created by placing the more significant decision nodes on the top to the tree, as schematically shown in FIG. 4 in an intuitive manner.

Once the initial population is created by the initial population creation subsystem 1 as described above and shown in FIG. 4, it can be stored in the population database 8 and provided as an input to the genetic evolutionary process for maximizing the detection accuracy provided for by the remaining subsystems 2, 3, 4, 5, 6 and 7.

The population evaluation subsystem 2 performs an evaluation process to decide which of the decision trees of the initial population to use. In order to infer to the best individual, the evaluation process can be based on several legacy classification metrics. Aspirant classification metrics could be the Accuracy, Mean F-Measure, Average Accuracy, Attack Accuracy, Attack Detection Rate or the False Alarm Rate etc., for example determined by one or more of the following equations.

$$Accuracy = \frac{1}{N}\sum_{i=1}^{|C|} TP_i$$ (equations 1)

$$MeanFMeasure = \frac{1}{|C|}\sum_{i=1}^{|C|} Fmeasure_i$$

where: $Fmeasure_i = \frac{2 \times Recall_i \times Precision_i}{Recall_i + Precision_i}$ $$Precision_i = \frac{TP_i}{TP_i + FP_i}, \quad Recall_i = \frac{TP_i}{TP_i + FN_i}$$

$$AvgAcc = \frac{1}{|C|}\sum_{i=1}^{|C|} \frac{TP_i}{TP_i + FN_i}$$

$$AttAcc = \frac{1}{|C|-1}\sum_{i=2}^{|C|} \frac{TP_i}{TP_i + FN_i}$$

$$FAR = \frac{FP_{Normal}}{TP_{Normal} + FP_{Normal}}$$

$$AttDetRate = \frac{\sum_{i=2}^{|C|} TP_i}{\sum_{i=2}^{|C|} TP_i + FP_i}$$

|C|: is the number of classes in the dataset $TP_i$: True Positives, $FN_i$: False Negatives, $FP_i$: False Positives – for the $i^{th}$ class Accuracy measures the frequency of correct decisions. It is a fraction of the correct decisions made among all the classes divided by the total number of instances in the dataset. The Mean F-Measure is used to measure the balance between the precision and the recall according to the above equations for a multi-classed problem. Average accuracy can be calculated as the average recall among all the categories. Attack accuracy can be used to measure the ability of a model to detect solely the attack classes by not taking into consideration the normal traffic. Index i=1 stands for the normal traffic class. Attack detection rate stands for the accuracy rate for the attack classes, that is to say, normal instances classified incorrectly as attacks. The false alarm rate (FAR) is a metric focused on the normal traffic and quantifies the false negatives.

The parents selection subsystem 3, as part of the genetic evolutionary approach, is operable to gradually create a new population, preferably better than the previous one in at least one aspect. To do so, the parents selection subsystem 3 is driven by a probabilistic method to come up with two individuals who will be crossed over and mutated in the parents crossover and the parents mutation subsystems 5 and 6, respectively.

In an embodiment, the probabilistic method for calculating the selection probability of a given individual is given by the following formula:

$F(I_i)=\alpha f_1(I_i)+\beta f_2(I_i)+\gamma f_3(I_i)$, (equation 2)

where:
- $f_1(I_i)$ is the class-based selection function for the $i^{th}$ individual.
- $f_2(I_i)$ is the actual fitness function for the $i^{th}$ individual (computed by subsystem 2).
- $f_3(I_i)$ is the missing classes function of the best individual.
- α, β and γ are the weights of $f_1$, $f_2$ and $f_3$ respectively (where α+β+γ=1).

The class-based Selection function $f_1(I_i)$ instructs the system toward maximizing the selection probability of those individuals containing more leaves of the minority classes for the given dataset.

$$f_1(I_i) = \sum_{j=1}^{|C|} \left( (1-p_j) \frac{NumOfLeaves_j}{TotalLeaves} \right), \quad \text{(equation 3)}$$

where:

$|C|$: the number of classes in the dataset.

$p_j$: the percentage of instances of the $j^{th}$'s class in the dataset.

$NumOfLeaves_j$: the number of $j^{th}$'s class leaves in the individual $TotalLeaves$: the total number of individual's leaves.

The fitness function $f_2(I_i)$ stands for the classification metric chosen to measure the classification ability of the individual. Among legacy classification metrics, average accuracy, in an embodiment, is preferred as the most prominent metric to be used as the fitness function.

The missing classes function $f_3(I_i)$ instructs the system toward maximizing the selection probability of those individuals containing leaves for classes missing on the best individual.

$$f_3(I_i) = \frac{1}{TotalLeaves} \sum_{j=1}^{m} (NumOfLeaves_j), \quad \text{(equation 4)}$$

where:

$m$: the number of missing classes in the best individual.

$NumOfLeaves_j$: number of $j^{th}$'s missing class leaves in the individual.

$TotalLeaves$: the total number of individual's leaves.

The proposed probabilistic method $F(I_i)$ is preferably weighted by three attributes, namely $\alpha$, $\beta$ and $\gamma$, applied to $f_1(I_i)$, $f_2(I_i)$ and $f_3(I_i)$ respectively in order to adjust the final result of the system accordingly.

$\alpha$ and $\beta$ weights are set by the admin 9, while $\gamma$ weight has a non-zero value if and only if there are missing classes at the leaves of the best individual. If the best individual is "normal", in the sense that all the classes indicated in the dataset are present at the best individual's leaves, then $\gamma$ is equal to 0, thus the missing classes function $f_3(I_i)$ is not applied in $F(I_i)$. The formula for $\gamma$ calculation is given below:

$$\gamma = 1 - \left( \alpha \frac{m}{|C|} + \beta \frac{m}{|C|} \right), \quad \text{(equation 5)}$$

where:

$m$: the number of missing classes in the best individual.

$|C|$: the number of classes in the dataset.

$\alpha$ and $\beta$ weights are complementary ($\alpha+\beta=1$) and preferably gradually change during operation of the system. A possible system configuration could be an assignment of a high value to $\alpha$ at the initiation of the system (e.g., $\alpha=0.8$ and $\beta=0.2$) in order to increase the selection probability $F(I_i)$ of individuals containing more leaves of the minority classes. Then, gradually, $\alpha$ is decreased while $\beta$ is increased until finally $\alpha=0$ and $\beta=1$. During this gradual variation of $\alpha$ and $\beta$, the $\gamma$ calculation formula is applied if and only if there are missing classes in the best individual.

In contrast to classifiers that trend toward neglecting minor classes of a dataset, the combination of $\alpha$, $\beta$ and $\gamma$ weights induct the selection function toward selecting parents who are able not only to classify accurately, but also to take into consideration the minor classes of the dataset by increasing the selection probability with respect to the inverse percentage of the instances of a class (parameter $(1-p_j)$ in equation 3). The $\gamma$ weight can is introduced in order to ensure that all the classes indicated by the dataset are present in the best individual. As discussed above, the initial decision trees can be of one class only. The final classification model thereby infers on traffic instance of all classes. Thus, through the evolutionary approach, the present invention, in an embodiment, ensures the presence of all classes in the best individual. This is why the $\gamma$ weight, in an embodiment, is applied with $f_3(I_i)$ in equation 2.

Figure 5:
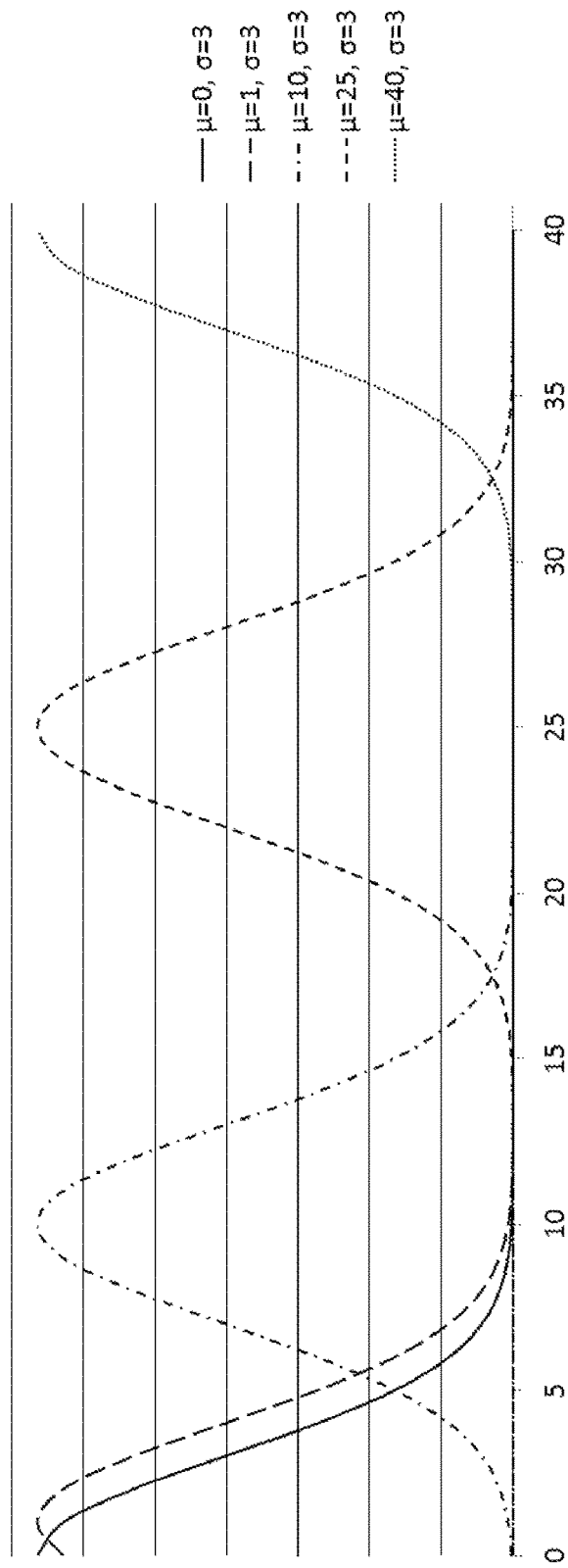
FIG. 5 shows Gaussian distribution snapshots for varying $\mu$.

The depth selection subsystem 4 develops a preparatory process for parents crossover and parents mutation subsystems 5 and 6. The depth generation utilizes a Gaussian distribution with mean ($\mu$) varying from zero to the maximum depth of decision trees (which is equal to the total number of features). More specifically, $\mu$ is gradually increased by one every time two parents are selected in subsystem parents selection 3 (see FIG. 5). When $\mu$ reaches its maximum value, it is then reinitialized to zero. The standard deviation ($\sigma$) is preferably set by the system administrator and can be adjusted accordingly. The approach of gradual variance of $\mu$ contributes toward forming highly branched individuals. The crossover and mutation operations will be applied on the individuals at the specific depth generated by the depth selection subsystem 4. The depth selection permits to create highly balanced individuals on multiple levels to explore the search area of the problem in a more efficient manner.

Figure 6:
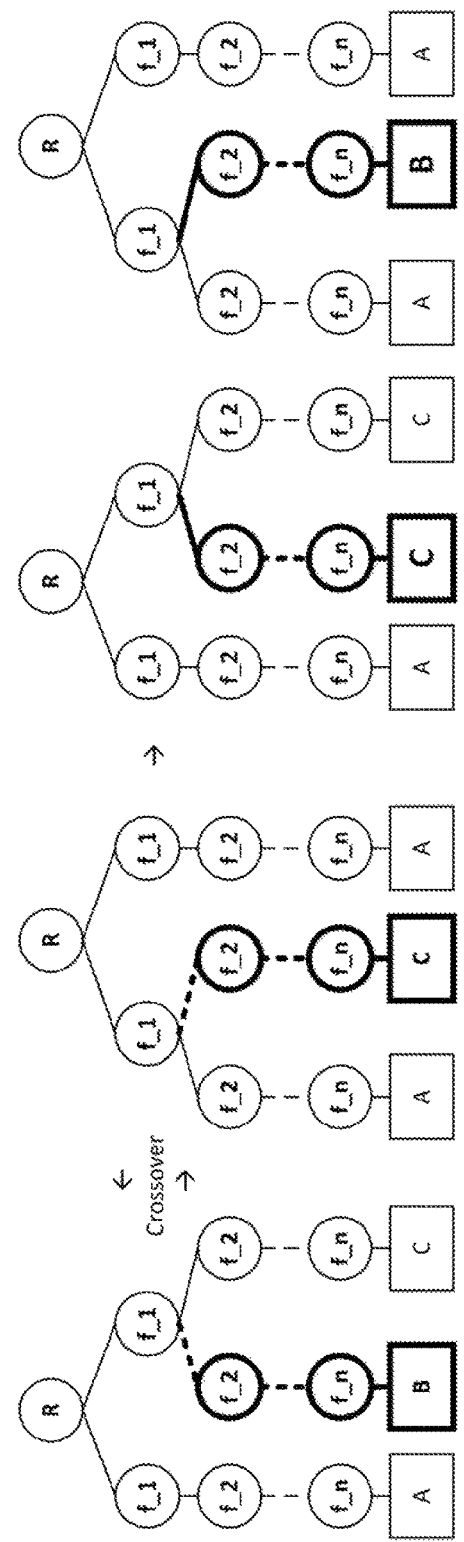
FIG. 6 illustrates a parents crossover process.

The parents crossover subsystem 5 provides a crossover process that is applied to the individuals who were selected in the parents selection subsystem 3. The evolutionary strategy synthesizes individual's characteristics by swapping randomly chosen branches between the individuals. The swapping process is schematically represented in an intuitive manner in FIG. 6, where the dashed braches are swapped resulting to two new individuals. This synthesis occurs based on a specific probability, preferably set by the system administrator, and to a specific depth among the nodes of the decision trees. The depth is indicated by the depth selection process in depth selection subsystem 4, as the depth was generated by the Gaussian distribution for a given $\mu$ and $\sigma$.

Figure 7:
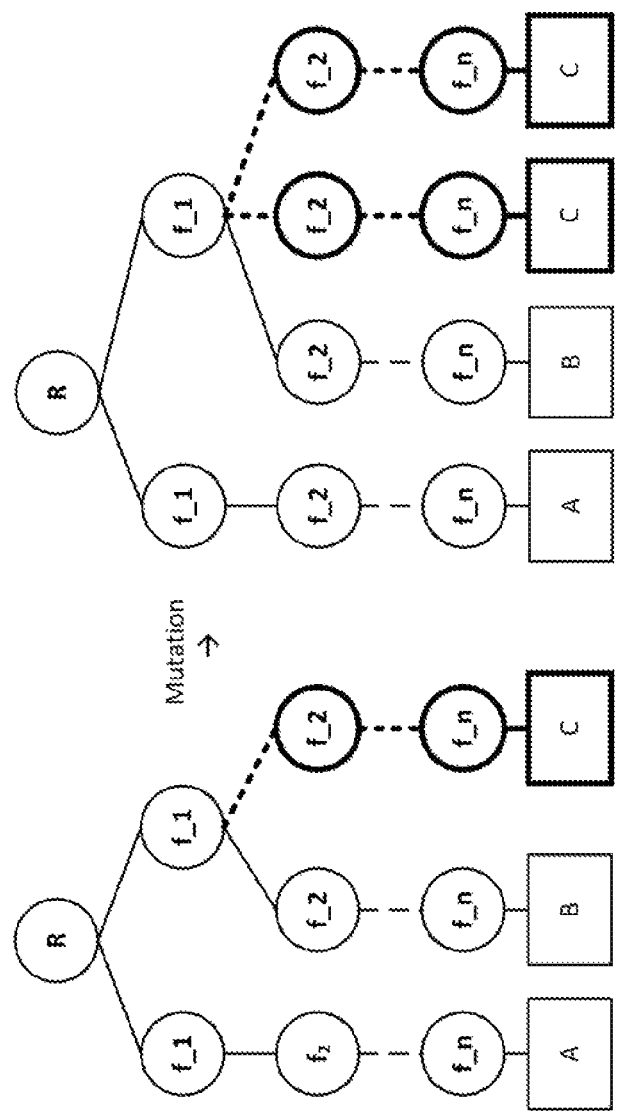
FIG. 7 illustrates a parents mutation process.

The parents mutation subsystem 6 provides a mutation process that is applied on the crossed over individuals in the form of splitting decision nodes on specific predefined splitting points (see FIG. 7). Given a dataset, the system utilizes the Minimum Description Length (MDL) principle proposed by Fayyad, Usama M. et al., "Multi-interval discretization of continuous-valued attributes for classification learning," Machine Learning, 1022-1027 (1993), which is hereby incorporated by reference herein, to discretize continuous intervals. Every splitting decision is taken based on the information gain on every possible splitting point on the selected decision node. Discrete features can be split in a more simple way. Examples of possible splitting points for both continuous and discrete features are given below:

Continuous: [0,100]
   [0,25], (25,41], (41,78], (79,93], (94,100]
Discrete: {http, smtp, pop3, ftp}
   {http}, {smtp, pop3, ftp}
   {http, smtp }, {pop3, ftp}
   {http, smtp, pop3}, {ftp}

As in the crossover process, the depth selection process of the depth selection subsystem 4 indicates the depth of the node intended to be split during the mutation process. A splitting decision divides a parent node into two new children branches. The information gain of a splitting point is calculated based on the following formula:

$$InfoGain(SplittingPoint) = \text{Entropy(parent)} - \left[\frac{x}{t}\text{Entropy(child}_1) + \frac{y}{t}\text{Entropy(child}_2)\right]$$ (equation 6)

where:
   parent: corresponds to the selected node for splitting.
   $child_1$: The first child node deriving from the split.
   $child_2$: The second child node deriving from the split.
   x: the number of instances of the dataset applying to node $child_1$.
   y: the number of instances of the dataset applying to node $chi/d_2$.
   t: the number of instances of the dataset applying to the parent node.

The splitting point that produces the highest information gain is chosen to split the corresponding branch. If a node cannot be further split or its splitting point does not produce any information gain, based on the given dataset, then the mutation operation is not applied.

The mutated individuals are added to the population database 8. When the population database contains as many new individuals as the initial population size, then the population replacement subsystem 7 is initiated.

Figure 8:
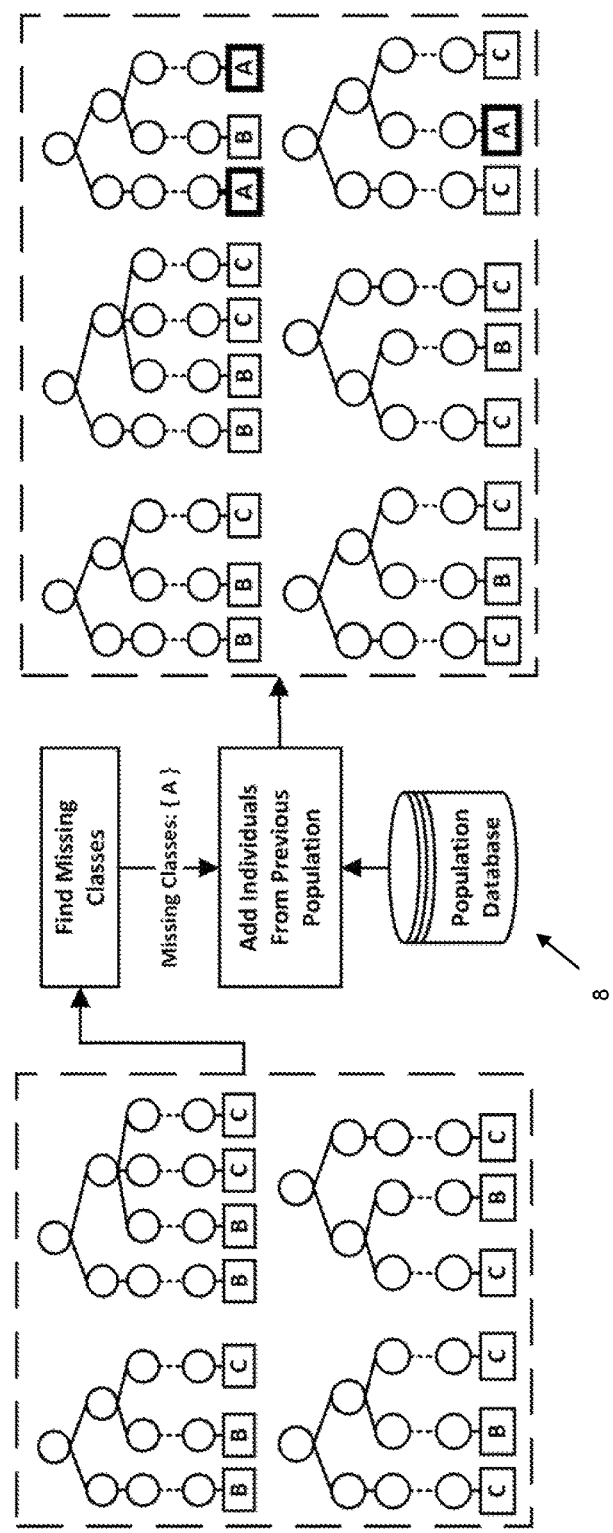
FIG. 8 illustrates a population replacement process.

The population replacement subsystem 7 is responsible for choosing the most suitable individuals among the population database 8 in order to generate the next population which will be used again as input to the evolutionary procedure. In this process, the population replacement subsystem 7 evaluates the classification accuracy of the individuals one-by-one and those with the higher fitness are finally moved to the next population. During this process several measures are taken in order to ensure the normality of the next population. A normal population requires all the classes indicated by the dataset to be present at the leaves of the individuals. Accordingly, the population replacement subsystem 7 checks for potentially missing classes in the population and, if there are any, then proceeds to the addition of extra individuals, for example, from the previous population which contain the missing classes in their leaves (see FIG. 8). The number of individuals added to the next population is a parameter adjusted proportionally to the total size of the population.

The subsystems 1, 2, 3, 4, 5, 6 and 7 described above cooperate toward gradually maximizing the classification accuracy in an effort to conclude to an end model able to classify all possible types of attacks with the highest possible accuracy. The operations described above can be repeated until a specific condition is met. This condition could be a specific number or iterations of the genetic algorithm or a specific score of a classification metric. During this repeated process, the accuracy of the individuals is gradually increased while the individuals are getting branched. The ultimate goal is to conclude to an end model able to classify all possible types of attacks with the highest possible accuracy. The subsystems 1, 2, 3, 4, 5, 6 and 7 can also be implemented in different combinations on the same processors and/or servers or on different processors and/or servers.

The accuracy results obtained by an embodiment of the present invention compared to the state-of-the-art of Elhag are summarized in the following Table 1. The results of the present invention are also compared to those of C4.5 classifier which is a decision tree algorithm used for classification problems. The input data used to evaluate and compare our system is the KDD Cup 1999 dataset.

TABLE 1

|  | C4.5 | State-of-the-art | Present Invention |
| --- | --- | --- | --- |
| Average Accuracy | 87.79% | 89.32% | 90.57% |
| Attack Accuracy | 84.79% | 86.70% | 90.20% |
| False Alarm Rate | 0.20% | 0.19% | 0.02% |

The KDD Cup 1999 dataset is a standard still used in recent research today in machine learning approaches for building intrusion detection systems for detecting web service abuses. The KDD Cup 1999 dataset poses the same challenges with the network traffic and it provide a means for a valid comparison among different methods. The KDD Cup 1999 dataset was created by MIT Lincoln Labs in a military network environment simulating the U.S. Air Force LAN. The simulated traffic includes a variety of intrusions (24 different types of attacks) under different probability distributions all of them falling into four major categories:

DoS: Denial of service, e.g. syn flood.
PRB: Probing—surveillance and other probing, e.g. port scanning.
R2L: Root to Local—unauthorized access from a remote machine, e.g. guessing password.
U2R: User to Root—unauthorized access to local superuser (root) privileges, e.g., various "buffer overflow" attacks.

The individual attacks belonging to the major classes are given in Table 2.

TABLE 2

| Class | Attacks |
| --- | --- |
| DoS | back, land, neptune, pod, smurf, teardrop |
| PRB | ipsweep, nmap, portsweep, satan |
| R2L | ftp_write, guess_passwd, imap, multihop, phf, spy, warezclient, warezmaster |
| U2R | buffer_overflow, loadmodule, perl, rootkit |

The raw traffic data captured during the simulations was transformed into machine learning labeled instances representing "good" and "bad" connections to the target system. The initial size of the dataset (approx. 5M instances) renders the set too bulky for training known machine learning algorithms. Thus, the vast majority of the prior art approaches make use of only a smaller dataset, deriving from the original one, while trying to keep the properties of the initial dataset.

Table 3 below shows a confusion matrix.

TABLE 3

|  | Normal | DoS | PRB | U2R | R2L | Recall |
|---|---|---|---|---|---|---|
| Normal | 72746 | 1485 | 2373 | 271 | 2184 | 92.01 |
| DoS | 1548 | 45748 | 1585 | 34 | 193 | 93.16 |
| PRB | 13 | 137 | 1726 | 12 | 26 | 90.18 |
| U2R | 1 | 0 | 2 | 26 | 3 | 81.25 |
| R2L | 6 | 5 | 10 | 13 | 870 | 96.24 |
| Precision | 97.89 | 96.56 | 30.30 | 7.30 | 26.55 |  |

Transforming a decision tree into decision rules can be performed in a straight forward manner. Every branch leading from the root of the tree to a leaf, can be represented as an "if-then" condition where the "if" clause contains the conjunction of the conditions (derived from the nodes) and the outcome is the class of the leaf. The decision rules have the following form, given an instance $X=(x_1, x_2, \ldots, x_n)$:

$$\text{IF } (x_i \epsilon A_i \text{ AND } \ldots \text{ AND } x_n \epsilon A_n) \text{ THEN Class}=C \quad \text{(equation 7)}$$

where:
- $x_i$: is the value of the $i^{th}$ feature of the dataset instance X,
- $A_i$: is a value interval or a set of values corresponding to a node of depth i, and
- C: is the predicted class of the instance.

In this manner, the straightforward manner of producing the decision rules from the decision trees enables one to easily understand the conditions and the outcome. Accordingly, the premise of human understandable rules is met in this embodiment.

Especially advantageous features in different embodiments of the present invention in no particular order include:
- Selection probability function in the parents selection subsystem 3

$$(F(I_i)=\alpha f_1(I_i)+\beta f_2(I_i)+\gamma f_3(I_i)),$$

- The methodology of the replacement method in the population replacement subsystem 7, wherein the missing classes in the best individual are taken into consideration,
- The mutation splitting methodology of the parents mutation subsystem 6,
- The prioritized feature ordering during the initial population creation in initial population creation subsystem 1, and/or
- The depth selection process in the context of the evolutionary approach and the decision trees in subsystem 4.

In an embodiment, the present invention provides a method for generating detection rules and adapting an IDPS and/or taking countermeasures to prevent an attack, the method comprising:

Setup phase:
1. Gain network filtered traffic instances from network traffic, deriving from the network tap 14.
2. Build an initial population of decision trees.
3. Sort the nodes of the decision trees based on the information gain of the network features for the given traffic instances.
4. Select two individuals from the population based on their selection probability, as this is calculated based on the formula of the parents selection subsystem 3, given the α, β and γ parameters.
5. Select a depth for applying crossover and mutation operations.
6. Apply crossover operation on the individuals selected in step 4.
7. Apply mutation operation to the crossed over individuals selected in step 4.
8. Create a next population by applying a replacement operation.
9. Evaluate the population in order to determine the best individual.

Working phase:
1. Transform the optimal decision tree into decision rules and add the decision rules into the decision rules database 8.
2. Evaluate network traffic 19 based on the decision rules in the database.
3. Issue an alert based on the network traffic 19 satisfying the conditions of the decision rules.
4. Take countermeasures against the potential attack such as notification e-mails to system administrators, enabling and providing monitoring actions for tracing the source and the purpose of the abusive action, reconfiguration of firewall rules to block the source of the attack, isolation of/disconnecting the under-attack network asset from the network, etc.

Advantages of the present in invention include also the following:
- The evolutionary approach evolves detection rules toward maximizing accuracy for detecting rare attacks. Additionally, the system parameterized as discussed above increases detection accuracy for rare attack classes. These types of attacks may occur rarely, but their impact is high.
- Additional pre-processing steps are avoided.
- The proposed method is applied on the input data in a straightforward manner. State-of-the-art solutions are based on fuzzy association rule-based classification systems to deal with the problems. These approaches engage also the need to define and to treat the input in a more complex way by introducing more pre-processing steps to transform data for fuzzy analysis (defining membership functions etc.).
- Higher average accuracy and higher detection accuracy for rare attack types.
- The proposed system is able to generate detection rules able to detect rare attacks, but at the same time the overall average accuracy is higher than the other state-of-the-art approaches.

In any classification problem there is always a tradeoff between False Negatives and False Positives. In the context of IDPSs, high False Alarm rates could render an IDPS impractical. For this reason, it is especially advantageous that the present invention is able to achieve comparatively low False Alarm rates.

Because the search area of a network traffic analysis problem can be huge, the input is not predictable or constant and therefore the detection rules which will be generated can be difficult to predict. However, in one embodiment, several experiments are conducted over the same input to provide a more concrete set of detection rules.

The proposed system could also be a part of a complete solution for assisting the process of generating detection rules for IDPSs and used for analyzing network traffic and providing network security solutions for security sensitive environments/organizations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A detection rules generation engine, comprising one or more processors and/or servers, which alone or in combination, are configured to provide for execution of the following steps:
   receiving filtered network traffic instances from a network tap and building an initial population of decision trees having nodes which are sorted based on an information gain of network features of the traffic instances;
   selecting two individuals from the population based on a selection probability, wherein the selection probability is given by:

$F(I_i) = \alpha f_1(I_i) + \beta f_2(I_i) + \gamma f_3(I_i)$, where:
   $f_1(I_i)$ is the class-based selection function for the $i^{th}$ individual,
   $f_2(I_i)$ is the actual fitness function for the $i^{th}$ individual,
   $f_3(I_i)$ is the missing classes function of the best individual, and
   $\alpha$, $\beta$ and $\gamma$ are the weights of $f_1$, $f_2$ and $f_3$, respectively (where $\alpha+\beta+\gamma=1$);
   selecting a depth among the nodes of the decision trees;
   applying a crossover operation on the selected individuals;
   applying a mutation operation on the selected individuals; and
   generating a next population.

2. The detection rules generation engine according to claim 1, wherein the one or more processors and/or servers are further configured to provide for execution of the step of selecting a best individual of the next population.

3. The detection rules generation engine according to claim 2, wherein the one or more processors and/or servers are further configured to provide for execution of the step of adding any missing classes to the best individual.

4. The detection rules generation engine according to claim 1, wherein the one or more processors and/or servers are configured to provide for execution of the step of performing the crossover operation by swapping randomly chosen branches between the selected individuals so as to provide a synthesis to the selected depth.

5. The detection rules generation engine according to claim 1, wherein the one or more processors and/or servers are configured to provide for execution of the step of performing the mutation operation by splitting the nodes of the selected individuals at the selected depth and at a splitting point which provides a highest information gain.

6. The detection rules generation engine according to claim 1, further comprising a population database configured to store the next population.

7. A method for generating detection rules, comprising:
   receiving filtered network traffic instances from a network tap;
   building an initial population of decision trees having nodes which are sorted based on an information gain of network features of the traffic. instances;
   selecting two individuals from the population based on a selection probability, wherein the selection probability is given by:

$F(I_i) = \alpha f_1(I_i) + \beta f_2(I_i) + \gamma f_3(I_i)$, where:
   $f_1(I_i)$ is the class-based selection function for the $i_{th}$ individual,
   $f_2(I_i)$ is the actual fitness function for the $i^{th}$ individual,
   $f_3(I_i)$ is the missing classes function of the best individual, and
   $\alpha$, $\beta$ and $\gamma$ are the weights of $f_1$, $f_2$ and $f_3$, respectively (where $\alpha+\beta+\gamma=1$);
   selecting a depth among the nodes of the decision trees;
   applying a crossover operation on the selected individuals;
   applying a mutation operation on the selected individuals; and
   generating a next population.

8. The method according to claim 7, further comprising selecting a best individual of the next population.

9. The method according to claim 8, further comprising adding any missing classes to the best individual.

10. The method according to claim 7, further comprising:
    transforming the decision tree of the best individual into decision rules;
    adding the decision rules into a decision rules database;
    evaluating network traffic based on the decision rules in the decision rules database;
    providing an alert based on the network traffic satisfying conditions of the decision rules; and
    initiating countermeasures against a potential attack.

11. The method according to claim 7, wherein the crossover operation is performed by swapping randomly chosen branches between the selected individuals so as to provide a synthesis to the selected depth.

12. The method according to claim 7, wherein the mutation operation is performed by splitting the nodes of the selected individuals at the selected depth and at a splitting point which provides a highest information gain.

13. A tangible, non-transitory computer readable medium having instructions thereon, which, when executed on one or more processors cause execution of a method comprising:
    building an initial population of decision trees having nodes which are sorted based on an information gain of network features of filtered traffic instances;
    selecting two individuals from the population based on a selection probability, wherein the selection probability is given by:

$F(I_i) = \alpha f_1(I_i) + \beta f_2(I_i) + \gamma f_3(I_i)$, where:

$f_1(I_i)$ is the class-based selection function for the $i_{th}$ individual, $f_2(I_i)$ is the actual fitness function for the $i^{th}$ individual, $f_3(I_i)$ is the missing classes function of the best individual, and $\alpha, \beta$ and $\gamma$ are the weights of $f_1$, $f_2$ and $f_3$, respectively (where $\alpha+\beta+\gamma=1$);

selecting a depth among the nodes of the decision trees;

applying a crossover operation on the selected individuals;

applying a mutation operation on the selected individuals; and generating a next population.

* * * * *